United States Patent

Hino et al.

[11] 3,769,498
[45] Oct. 30, 1973

[54] SYSTEM FOR CONTROLLING A COMPUTING SCALE

[75] Inventors: Masamichi Hino; Iwao Hara, both of Osaka, Japan

[73] Assignee: Kubota Tekko Kabushiki Kaisha (Kubota, Ltd.), Osaka, Japan

[22] Filed: Oct. 22, 1971

[21] Appl. No.: 191,610

[52] U.S. Cl. ............................. 235/151.33, 177/25
[51] Int. Cl. ....................... G01g 19/413, G06f 7/38
[58] Field of Search ................. 235/151.33, 92 WT; 177/25, DIG. 116

[56] References Cited
UNITED STATES PATENTS

| | | | |
|---|---|---|---|
| 3,612,842 | 10/1971 | Aga et al. | 235/151.33 |
| 3,657,526 | 4/1972 | Konisi et al. | 235/151.33 |
| 3,557,353 | 1/1971 | Allen et al. | 235/151.33 |
| 3,587,759 | 6/1971 | Susor | 235/151.33 X |

*Primary Examiner*—Malcolm A. Morrison
*Assistant Examiner*—Edward J. Wise
*Attorney*—E. F. Wenderoth et al.

[57] ABSTRACT

A controlling system for a computing scale. The system has a circulating register formed in a series having desired figure of desired bits. An input signal selecting and changing circuit is connected to the circulating register, and a decimal adding circuit is connected to the input signal selecting and changing circuit. The circulating register, input signal selecting and changing circuit and decimal adding circuit form an amount cost counting means which is operated according to input signals of weight and unit cost. The circulating register has an intermediate terminal at a predetermined position thereof, a zero weight discriminating circuit and a weight subtraction discriminating circuit which are connected to the intermediate terminal of the circulating register. A weight and packing discriminating circuit and a displaying means are provided, the operation of the weight and packing discriminating circuit being changed correspondingly to output signals from the zero weight discriminating circuit and from the weight subtraction discriminating circuit. The contents thereof are memorized in the circulating shift register. A calculating operation of the cost is performed within the circulating shift register synchronized with a timing pulse by the amount cost counting means, and the contents of a certain range of the circulating shift register are displayed by the displaying means.

4 Claims, 10 Drawing Figures

SYSTEM FOR CONTROLLING A COMPUTING SCALE

This invention relates to a system for controlling a computing scale which is used to weight of materials when selling those materials and at the same time which multiplies the measured weight of the material by a unit cost per unit weight of that material and displays the total cost of that material.

In the computing scale as described above, two input signals are provided thereto at voluntary time, i.e., an input signal corresponding to the weight of the material and a signal corresponding to a cost per unit weight of that material (unit cost), and it is always necessary to arrive at a correct total cost of the material according to those two input signals and to display instantly the unit cost, the weight and the total cost.

The object of the present invention is to provide a control system for a computing scale which carries out multiplication of a weight and a unit cost, which are always changeable, by using one circulating register and which displays correct values on a means such as a numerical display tube.

Such an object can be accomplished by means of various circuit configurations which compose the system of the invention. One embodiment of the invention will now be described in the following detailed description of the invention taken together with the accompanying drawings.

The system of the invention comprises a circulating register formed in a series with necessary bits and figures, an input signal selecting and switching circuit connected to said register, a decimal adding circuit connected to said circuit, said register and said two circuits forming a total cost counting means which is operated according to input signals of a weight and a unit cost, a zero-weight discriminating circuit for discriminating zero weight, a subtraction discriminating circuit for discriminating subtraction of the weight, said two discriminating circuits being connected to a certain position of said register, another discriminating circuit for discriminating the net weight and the tare, and a displaying means, wherein the net weight and tare are selected by said net weight and tare discriminating circuit correspondingly to discriminated signals from said zero-discriminating circuit and said subtraction discriminating circuit, and the total cost is counted by said total cost counting means, and then the contents of a certain range of said register are displayed by said displaying means.

FIG. 2 is a flow-chart for explaining the operation of the system of FIG. 1.

FIG. 3 shows the construction of a shift register used in the system of FIG. 1.

FIGS. 4-1 to 4-7 show an example of a practical circuit diagram of the system of the invention.

Figure 1:
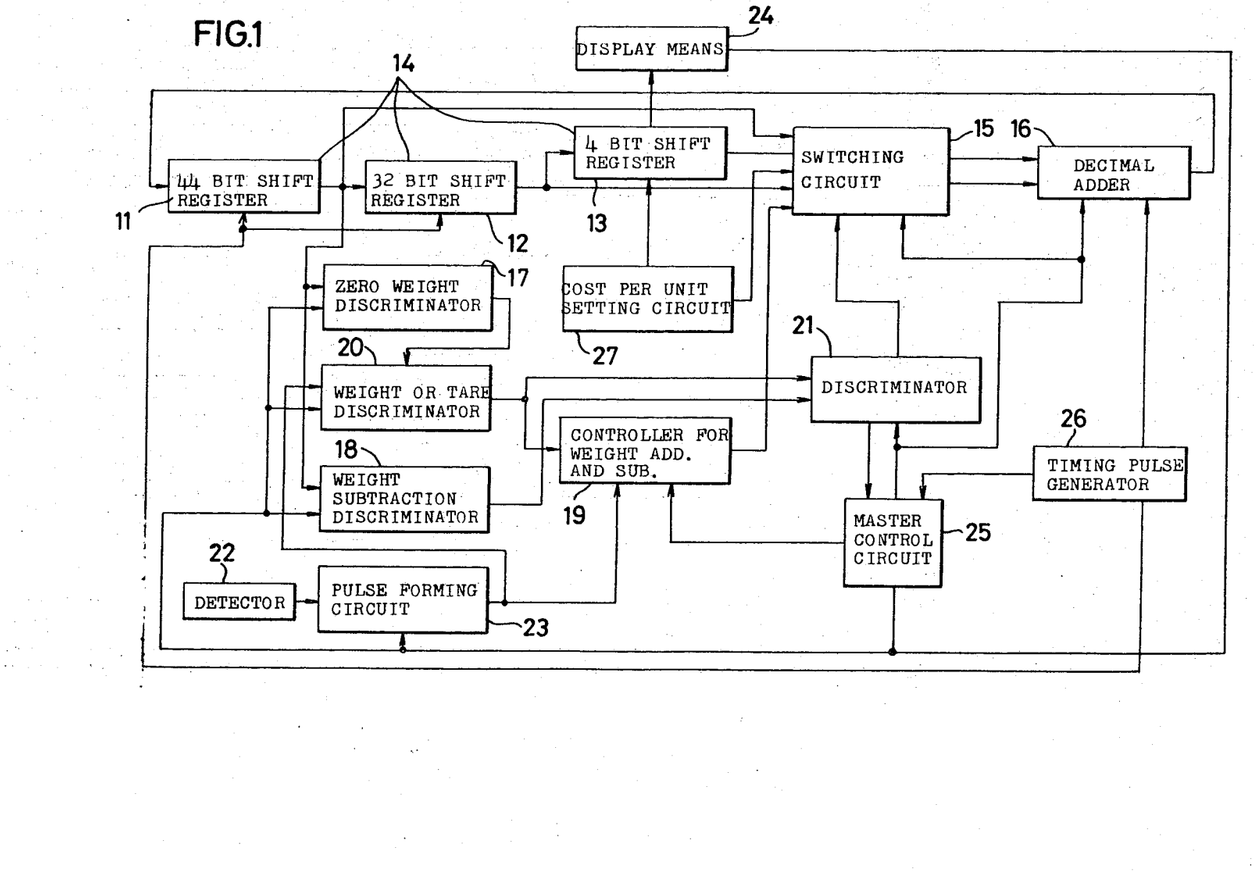
FIG. 1 shows a block diagram of a controlling system according to the invention.
Figure 41:
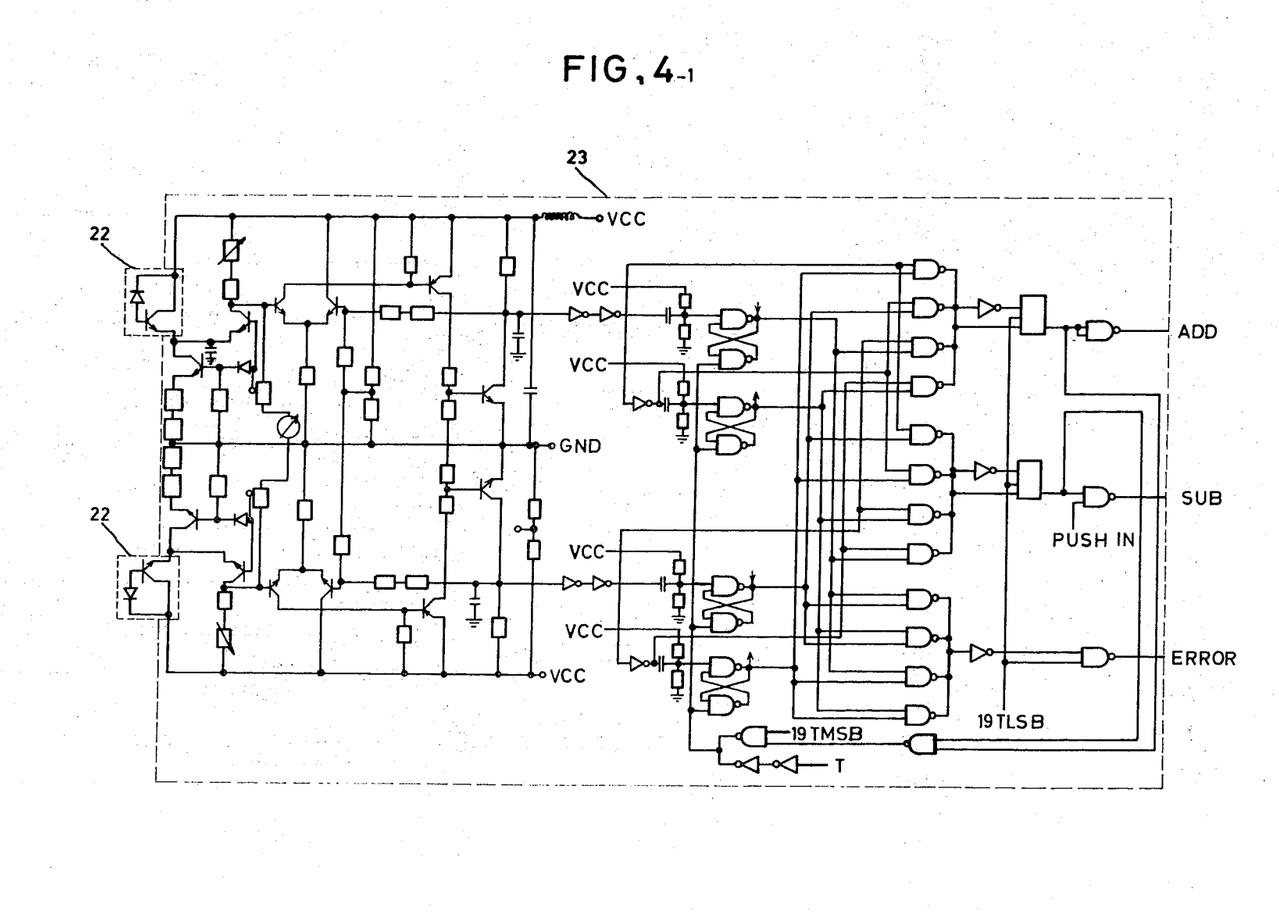
Figure 42:
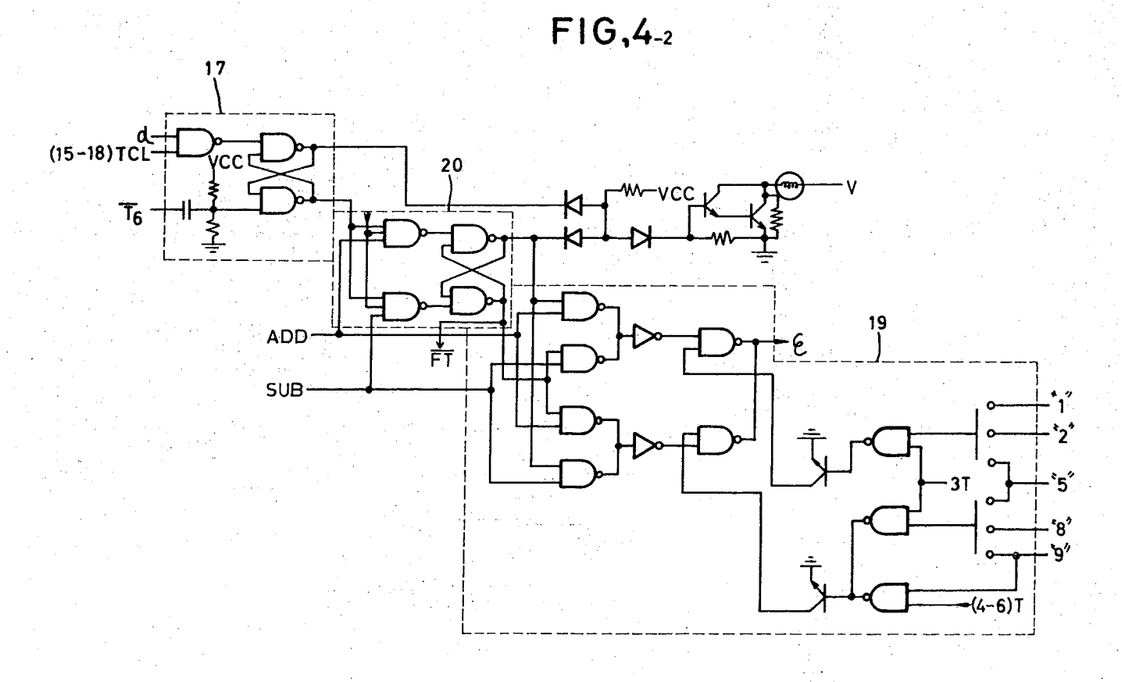
Figure 43:
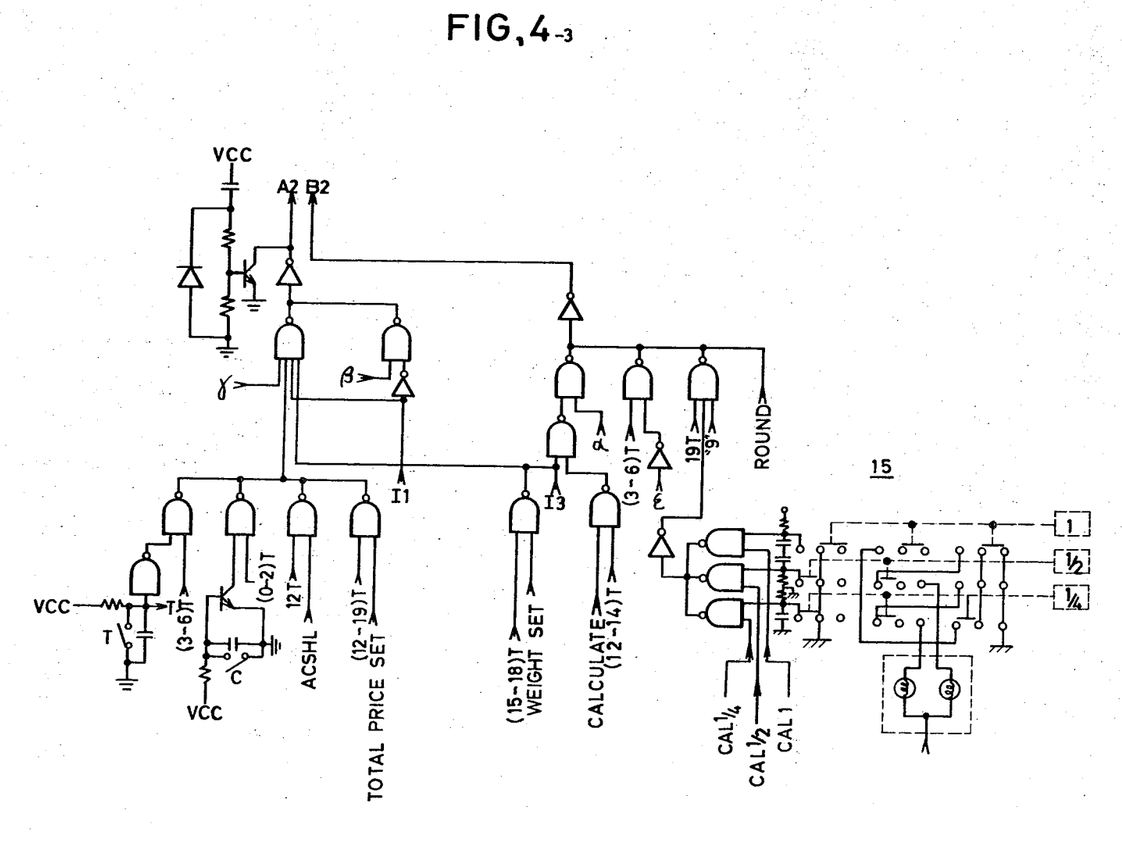
Figure 44:
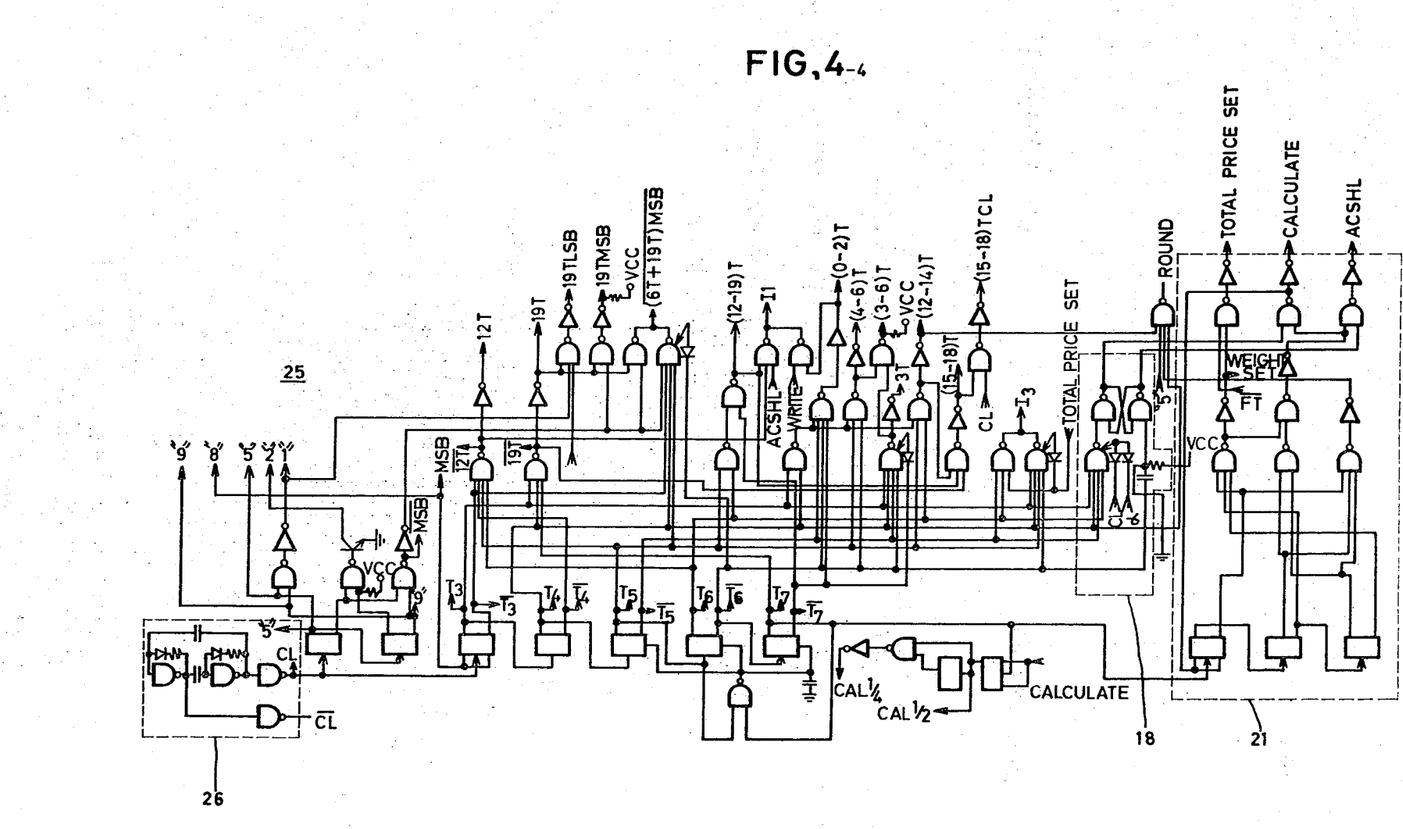
Figure 45:
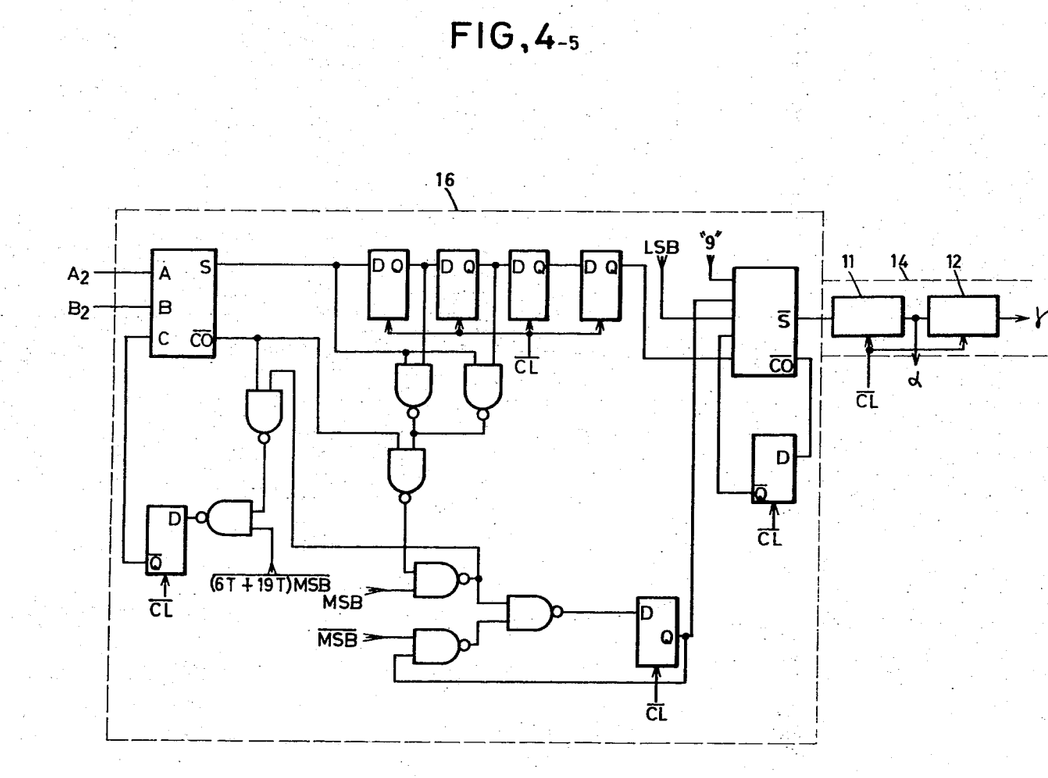
Figure 46:
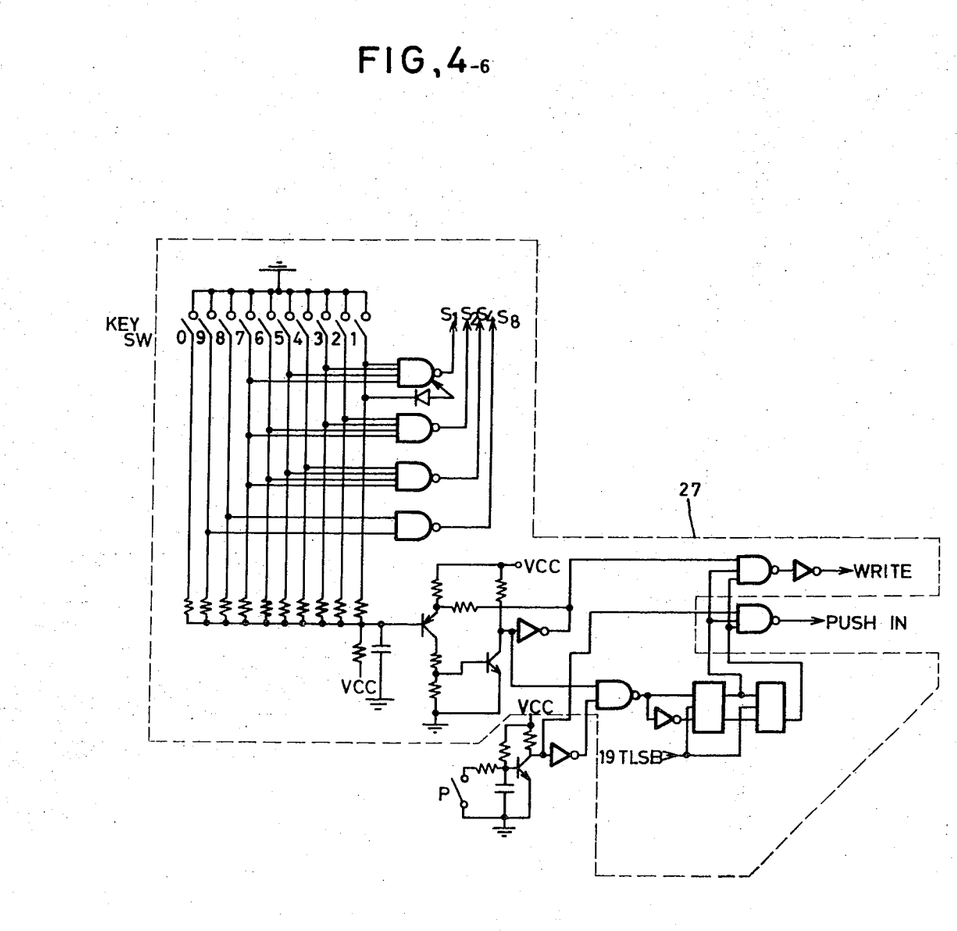
Figure 47:
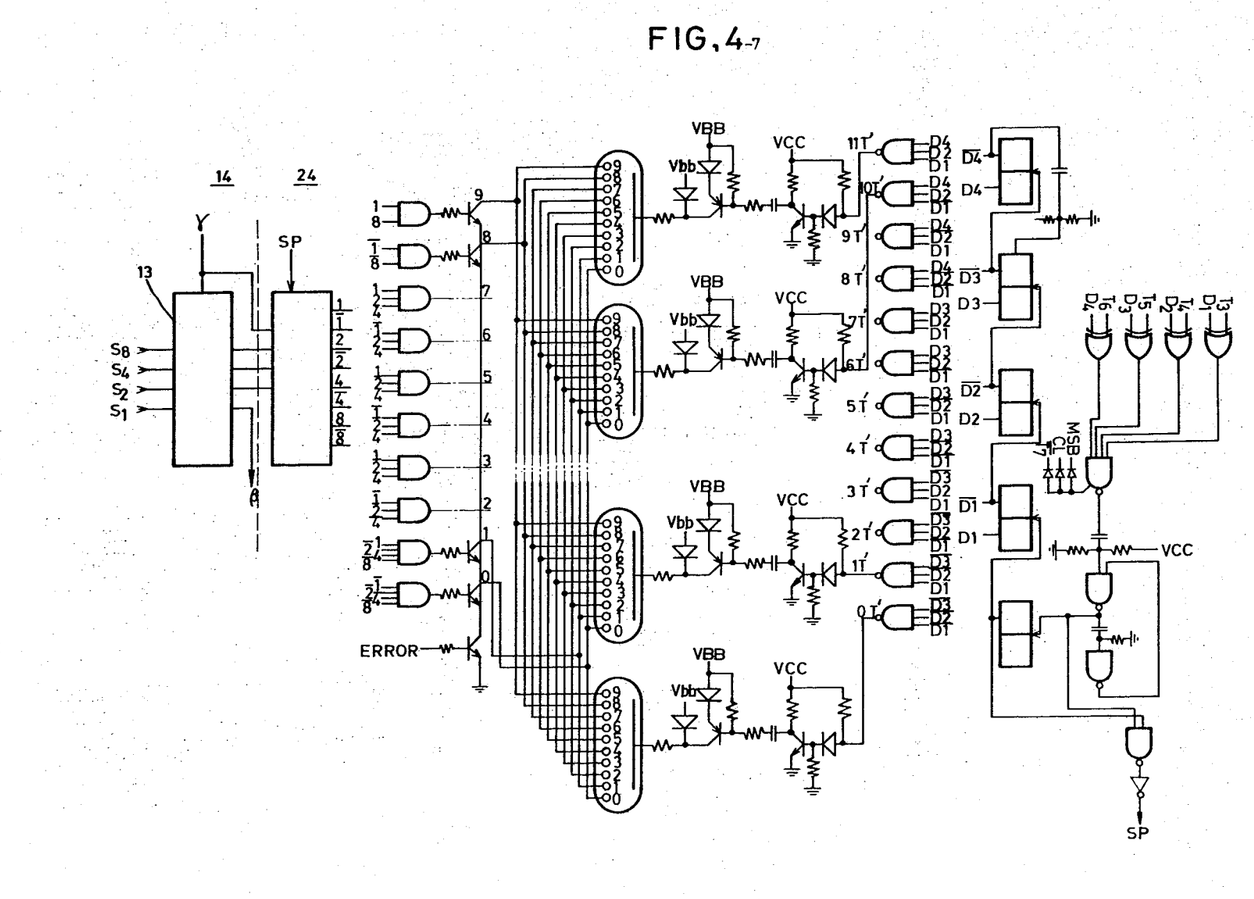

Referring to FIG. 1, the reference numeral 11 designates a shift register of 44 bits in which one figure is formed by 4 bits. Numeral 12 is a 32 bit shift register and 13 is a 4 bit shift register. These three shift registers 11, 12 and 13 form a series shift register 14 consisting of the parts corresponding to the weight, unit cost, total cost and calculation memory, as shown in FIG. 3. An input signal switching circuit 15 controls the switching of each input signal to the shift register 14. Circuits 16 is a decimal adding circuit.

A circulating calculation means is formed by these shift registers, the input signal switching circuit and the decimal adding circuit. An intermediate terminal for providing an intermediate output signal is arranged at the rear of the 44 bit register of the shift register 14, and there are connected thereto a zero weight discriminating circuit 17 which controls addition and subtraction of the weight input signal and discriminates the net weight from the tare, and a zero weight subtraction discriminating circuit 18 which counts the total cost. These two discriminating circuits are connected respectively to a circuit 19 for controlling addition and subtraction of the weight, which is connected to a net weight and tare discriminating circuit 20, and a discriminating circuit 21 for controlling the input signal switching circuit 15. A detecting means 22 converts the amount of movement of a weighing means of the computing scale into an electric signal, and comprises, for example, a photoconductive element.

When the computing scale comprises for example, a pendulum type balance, the movement of the pendulum is converted into an electric signal by irradiating a fixed slit plate with light through a graduated plate means provided with an alternating bright and dark stripe pattern and which is fixed to the pendulum so as to pass the light intermittently through the slit plate and by then detecting the intermittent light. A pair of detecting means are provided with the graduated plate and slit plate and these are arranged with a certain difference of phase therebetween so that different output signals are provided from the detector means 22 according to the direction of movement of the pendulum. This makes it possible to discriminate the positive and negative polarities of the signals. Further, because the signal from the detecting means 22 is in sine wave, it is formed into a pulse wave by a pulse forming circuit 23. A base controlling circuit 25 and a timing signal generating circuit 26 are connected to the discriminating circuit 21, and a display means 24 comprising a numerical display tube is connected to the register 13. FIGS. 4-1 to 4-7 show practical examples of each circuit described hereinbefore.

In the following, the controlling operation of the system of the invention will be described. When a material to be weighed and counted is loaded on a loading pan, indication of which is omitted in the drawings, of the computing scale, the pendulum of the scale rotates and the amount of rotation thereof is detected and converted into an electric signal by the detecting means 22. The electric signal is formed into a pulse signal by the pulse forming circuit 23 and is provided to the weight addition and subtraction controlling circuit 19. When the material to be weighed is loaded on the scale, the pendulum oscillates several times, and with the gradual attenuation of amplitude thereof it stops at a position balanced with the weight of the material. Therefore, the detecting means 22 generates positive and negative signals, and they are provided to the weight addition and subtraction controlling circuit 19 from the wave forming circuit 23 as an addition signal and a subtraction signal, respectively. At this time, the weight discriminating circuit 17 discriminates that the weight content of the register 14 is zero or not. When that weight content of the register 14 is zero and the weight input signal is the addition signal, the weight and tare discriminating circuit 20 is changed to the weight, and addition of the weight content and the input signal is operated through the input signal switching circuit 15 and the result is memorized at the weight position of the shift register 14. When the zero weight discriminating circuit 17 indicates zero content of the register 14 and the weight input signal is the subtracton signal, the weight and tare discriminating circuit 20 is changed to the tare and subtraction is performed through the input signal switching circuit 15. Therefore, the register memorizes the subtracted weight.

If the zero weight discriminating circuit 17 does not indicate zero and the weight or tare discriminating circuit 20 shows the tare condition, the input signal provided as the addition signal is subtracted from the weight content in the register, and the input signal provided as the subtraction signal is added to the content in the register, since the actual weight of the tare has been memorized in the register.

If the zero weight discriminating circuit 17 does not indicate the zero weight and the weight or tare discriminating circuit 20 shows the weight condition, the input signal provided as the addition signal is added to the weight content, and the input signal provided as the subtraction signal is subtracted from the content. The result of the above calculation is memorized, as shown in FIG. 3, in the weight position of the shift register 14.

The cost per unit weight of the material to be weighed (i.e. unit cost) is set by the ten-key switches of the unit cost setting circuit 27. The unit cost is provided once to the 4-bit shift register 13 by pushing the key and is put in the register subsequently through the input signal switching circuit 15 and the decimal adding circuit 16.

The calculating operation of the total cost is described according to the flow-chart shown in FIG. 2. The operation is divided into eight steps by the master control circuit 25 shown in FIG. 1. Initially, the weight content of the register is discriminated to be zero or not, and if not zero the weight is set to section UA of the register 14 shown in FIG. 3 (i.e., the contents at the third to sixth figures of the register 14 is set at the 16th to 19th figures thereof).

During the first step, the content of the subtracted weight in the register is discriminated to be zero or not. When the content of the weight subtraction memorized at the 16th and 19th figure is not zero, at the second to fifth steps the unit cost stored at the zero to the second figures of the register 14 is added to the content of section LA, i.e. 12th to 15th figures of the register 14. Accordingly, when the content of the weight subtraction memory becomes zero when repeating the above operation, the content of the LA section of the register 14 becomes the total cost, and it is shifted to the total cost memorizing section in the seventh to 11th figures of the register 14. Then, an operation of one period is performed, and the values calculated continuously repeatedly are displayed by the displaying means 24.

In order to function adequately as a computing scale, the calculating operation must be performed at a speed that can follow the changes in the weight input and the unit cost input, and for this purpose the timing pulse generating circuit 26 shown in FIG. 1 is provided.

According to the present invention, the serial register 14 is formed as described hereinbefore and the contents thereof are circulated so as to perform the necessary calculating operation in the register 14, so that other registers are not necessary for the other part of the system. Accordingly, the system can be very simply constructed and so production thereof can be also simplified.

We claim:
1. In a control system for a computing scale:
a. a counting means for the total cost of an article by use of the input weight and unit price, said counting means including a serial circulating register divided into three input portions for the unit price, the weight and the total price, a transfer portion for the weight of an adding portion for the unit price; said counting means further including a switching circuit for selecting either the circulating operation of said register, an input operation for weight addition or weight subtraction, an input operation for setting the unit price, a shift operation of the register and a clearance operation of the register; and a decimal adder connected to the output of said switching circuit;
b. said register having an intermediate terminal, and
c. a zero weight discriminator connected to said intermediate terminal for discriminating whether the weight contents at the predetermined portion in said register is zero;
d. a circuit for discriminating between a weight and tare condition based on the logic of the zero weight discriminator and the condition of the input weight; and
e. a display means for displaying a predetermined range of said register.

2. A control system as claimed in claim 1 wherein means are provided for supplying two outputs having a certain phase difference from signals detected by a pair of detectors through dark and light striped patterns provided on a pendulum of said computing scale, and a means for forming weight pulses synchronously with timing pulses from a master control circuit, said weight pulses corresponding to the number of stripes which move relative to the pendulum.

3. A control system as claimed in claim 1 wherein means are provided for electronically memorizing a condition of weight or tare depending on the conditions where addition signals or subtraction signals are supplied when the content of the register is zero.

4. A control system as claimed in claim 1 wherein a means is provided for repeatedly and circulatingly calculating a total price, said means being adapted to follow the variation of weight before the balancing of the scale when the scale is loaded with an article.

* * * * *